United States Patent
Mizuno et al.

(10) Patent No.: US 10,826,096 B2
(45) Date of Patent: Nov. 3, 2020

(54) FUEL CELL SYSTEM

(71) Applicant: HONDA MOTOR CO., LTD., Tokyo (JP)

(72) Inventors: Jun Mizuno, Saitama (JP); Shigeru Toda, Saitama (JP); Keiji Tsukamoto, Saitama (JP); Hiroki Homma, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 461 days.

(21) Appl. No.: 15/464,034

(22) Filed: Mar. 20, 2017

(65) Prior Publication Data

US 2017/0288246 A1 Oct. 5, 2017

(30) Foreign Application Priority Data

Mar. 31, 2016 (JP) ................. 2016-073422

(51) Int. Cl.
  *H01M 8/0612* (2016.01)
  *H01M 8/04014* (2016.01)
  (Continued)

(52) U.S. Cl.
  CPC ........... *H01M 8/0618* (2013.01); *C01B 3/386* (2013.01); *C01B 3/48* (2013.01); *H01M 8/04014* (2013.01);
  (Continued)

(58) Field of Classification Search
  None
  See application file for complete search history.

(56) References Cited

U.S. PATENT DOCUMENTS 4,128,700 A * 12/1978 Sederquist .......... H01M 8/0612
                                                              429/415
2005/0217178 A1   10/2005 Aoyama
                    (Continued)

FOREIGN PATENT DOCUMENTS

JP    2002-280043    9/2002
JP    2004-018363    1/2004
                    (Continued)

OTHER PUBLICATIONS

Machine Translation JP2006-096601 (Year: 2006).*
(Continued)

*Primary Examiner* — Victoria H Lynch
(74) *Attorney, Agent, or Firm* — Rankin, Hill & Clark LLP

(57) ABSTRACT

An object of the present invention is to provide a fuel cell system for preventing carbon deposition in a fuel cell stack to be supplied with reformed gas. A fuel cell system 10A of the present invention includes a partial oxidation reformer 22 for partially oxidizing raw fuel to produce carbon monoxide and hydrogen, a shift reactor 23 for shift reacting the carbon monoxide with steam to produce carbon dioxide and hydrogen, a fuel cell stack 20 for generating electric power by electrochemical reaction between oxidant gas and the hydrogen which is produced in at least one of the partial oxidation reformer 22 and the shift reactor 23, and an exhaust gas recirculation pipe P6 for supplying steam contained in exhaust gas of the fuel cell stack 20 to the shift reactor 23.

3 Claims, 10 Drawing Sheets

(51) Int. Cl.
*C01B 3/38* (2006.01)
*C01B 3/48* (2006.01)
*H01M 8/0662* (2016.01)
*H01M 8/124* (2016.01)

(52) U.S. Cl.
CPC ..... *H01M 8/04022* (2013.01); *H01M 8/0662* (2013.01); *C01B 2203/0261* (2013.01); *C01B 2203/066* (2013.01); *C01B 2203/148* (2013.01); *C01B 2203/16* (2013.01); *H01M 2008/1293* (2013.01)

(56) References Cited

U.S. PATENT DOCUMENTS

| | | |
|---|---|---|
| 2006/0143983 A1 | 7/2006 | Matsui et al. |
| 2006/0182680 A1 | 8/2006 | Keefer et al. |
| 2009/0169931 A1* | 7/2009 | Qi .................... H01M 8/04097 429/409 |
| 2016/0141653 A1 | 5/2016 | Ruokomaki |

FOREIGN PATENT DOCUMENTS

| | | |
|---|---|---|
| JP | 2006-096601 | 4/2006 |
| JP | 2010-067534 | 3/2010 |
| JP | 2012-160465 | 8/2012 |
| JP | 2014-049256 | 3/2014 |

OTHER PUBLICATIONS

Machine translation JP 2002-280043 (Year: 2002).*
Machine translation JP 2014049256(A) (Year: 2014).*
Japanese Office Action dated Sep. 19, 2017, English abstract included, 6 pages.

* cited by examiner

FUEL CELL SYSTEM

CROSS REFERENCE TO RELATED APPLICATIONS

This application claims the foreign priority benefit under Title 35, United States Code, § 119 (a)-(d) of Japanese Patent Application No. 2016-073422, filed on Mar. 31, 2016, the disclosure of which is herein incorporated by reference in its entirety.

TECHNICAL FIELD

The present invention relates to a fuel cell system.

BACKGROUND ART

Conventionally, there has been known a fuel cell system using reformed gas as fuel gas (For example, see Patent Documents 1, 2). As the reformed gas, there is a gas obtained by a steam reforming reaction represented by the following equation (1) using hydrocarbon as raw fuel, or a gas obtained by a partial oxidation reaction represented by the following equation (2).

$$—CH_2—+H_2O \rightarrow CO+2H_2 \quad \text{equation (1)}$$

$$—CH_2+\tfrac{1}{2}O_2 \rightarrow CO+H_2 \quad \text{equation (2)}$$

In such a fuel cell system, the fuel cell system including a reformed gas supply device using the partial oxidation reaction, which has a higher reaction rate than that of the steam reforming reaction, is superior in gas treatment efficiency, and thus it is possible to reduce a size of the fuel cell system.

CITATION LIST

Patent Literature

[Patent Document 1]
Japanese Patent Application Publication No. 2012-160465
Patent Document 2
Japanese Patent Application Publication No. 2010-067534

SUMMARY OF INVENTION

Technical Problem

However, as shown in the following equation (3), CO (carbon monoxide) contained relatively more in the reformed gas deposits carbon (C).

$$2CO \Leftrightarrow CO_2+C \quad \text{equation (3)}$$

Deposited carbon causes coking in a fuel cell stack.

Therefore, an object of the present invention is to provide a fuel cell system for preventing carbon deposition in the fuel cell stack to be supplied with the reformed gas.

Solution to Problem

A fuel cell system of the present invention to solve the above problem includes a partial oxidation reformer for partially oxidizing raw fuel to produce carbon monoxide and hydrogen, a shift reactor for shift reacting the carbon monoxide with steam to produce carbon dioxide and hydrogen, a fuel cell stack for generating electric power by electrochemical reaction between oxidant gas and the hydrogen which is produced in at least one of the partial oxidation reformer and the shift reactor, and an exhaust gas recirculation pipe for supplying steam contained in exhaust gas of the fuel cell stack to the shift reactor. With this fuel cell system, carbon deposition in the fuel cell stack is prevented by reducing a carbon monoxide concentration in the fuel gas by shift reaction in the shift reactor.

Further, this fuel cell system can also be configured such that the fuel cell stack is formed by stacking a plurality of solid oxide fuel cells, and the exhaust gas contains anode off-gas of the solid oxide fuel cell. With this fuel cell system, the steam used in the shift reactor is supplied by the anode off-gas. Thus, it is possible to reuse the fuel gas which is unburned and contained in the anode off-gas, thereby improving power generation efficiency of the fuel cell system.

Further, this fuel cell system can also be configured to include an oxidant gas supply path which supplies oxidant gas for partially oxidizing the raw fuel to the partial oxidation reformer, and the oxidant gas supply path is disposed close to the shift reactor so that the oxidant gas flowing through the oxidant gas supply path can cool the shift reactor by heat exchange with the shift reactor. With this fuel cell system, even though hot reformed gas is fed into the shift reactor, the shift reactor is cooled by the oxidant gas supplied to the partial oxidation reformer, and thus it is possible to efficiently carry out the shift reaction in the shift reactor. Thus, the carbon monoxide concentration in the fuel gas is more efficiently reduced, so that carbon deposition in the fuel cell stack can be reliably prevented.

Further, this fuel cell system can also be configured such that the partial oxidation reformer and the shift reactor are formed integrally. With this fuel cell system, it is possible to reduce the size of the system.

Furthermore, this fuel cell system can also be configured to include a combustor for combusting the hydrogen which is unreacted and contained in the exhaust gas of the fuel cell stack, and the exhaust gas recirculation pipe supplies the steam contained in exhaust gas of the combustor to the shift reactor. With this fuel cell system, it is possible to supply steam to the shift reactor even before power generation in the fuel cell stack, for example, during warm-up. Thus, it is possible to more efficiently prevent carbon deposition in the fuel cell stack.

Advantageous Effects of Invention

According to the present invention, it is possible to provide a fuel cell system for preventing carbon deposition in the fuel cell stack to be supplied with the reformed gas.

DESCRIPTION OF EMBODIMENTS

Next, embodiments of the present invention will be described. A fuel cell system of the present invention includes a partial oxidation reformer as a fuel gas supply device for a fuel cell stack. Hereinafter, as an embodiment of the present invention, a stationary fuel cell system including a fuel cell stack having a plurality of solid oxide fuel cells (SOFCs) will be described as an example.

First Embodiment

Figure 1:
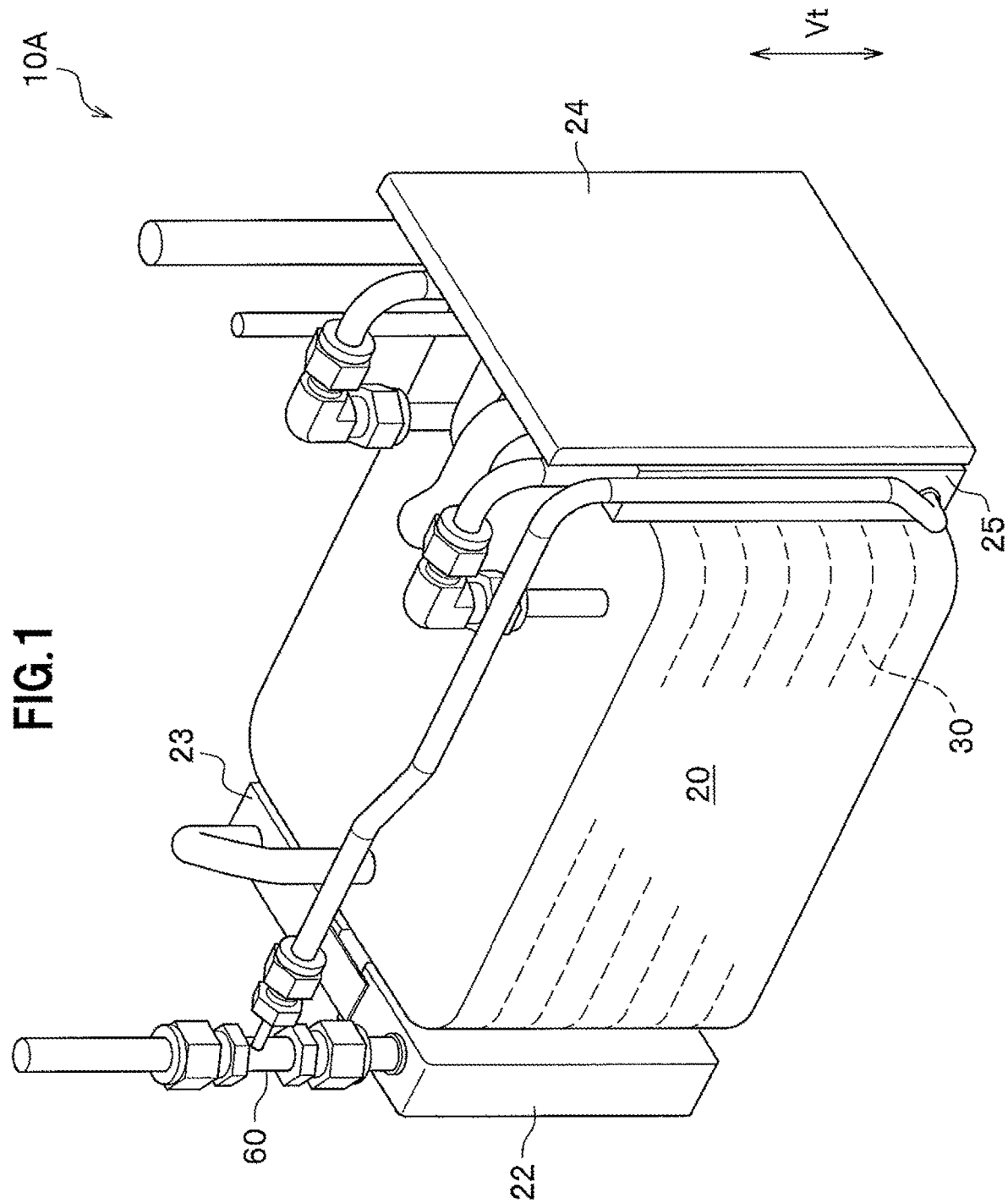
FIG. 1 is an external perspective view of a fuel cell system according to a first embodiment of the present invention.
Figure 2:
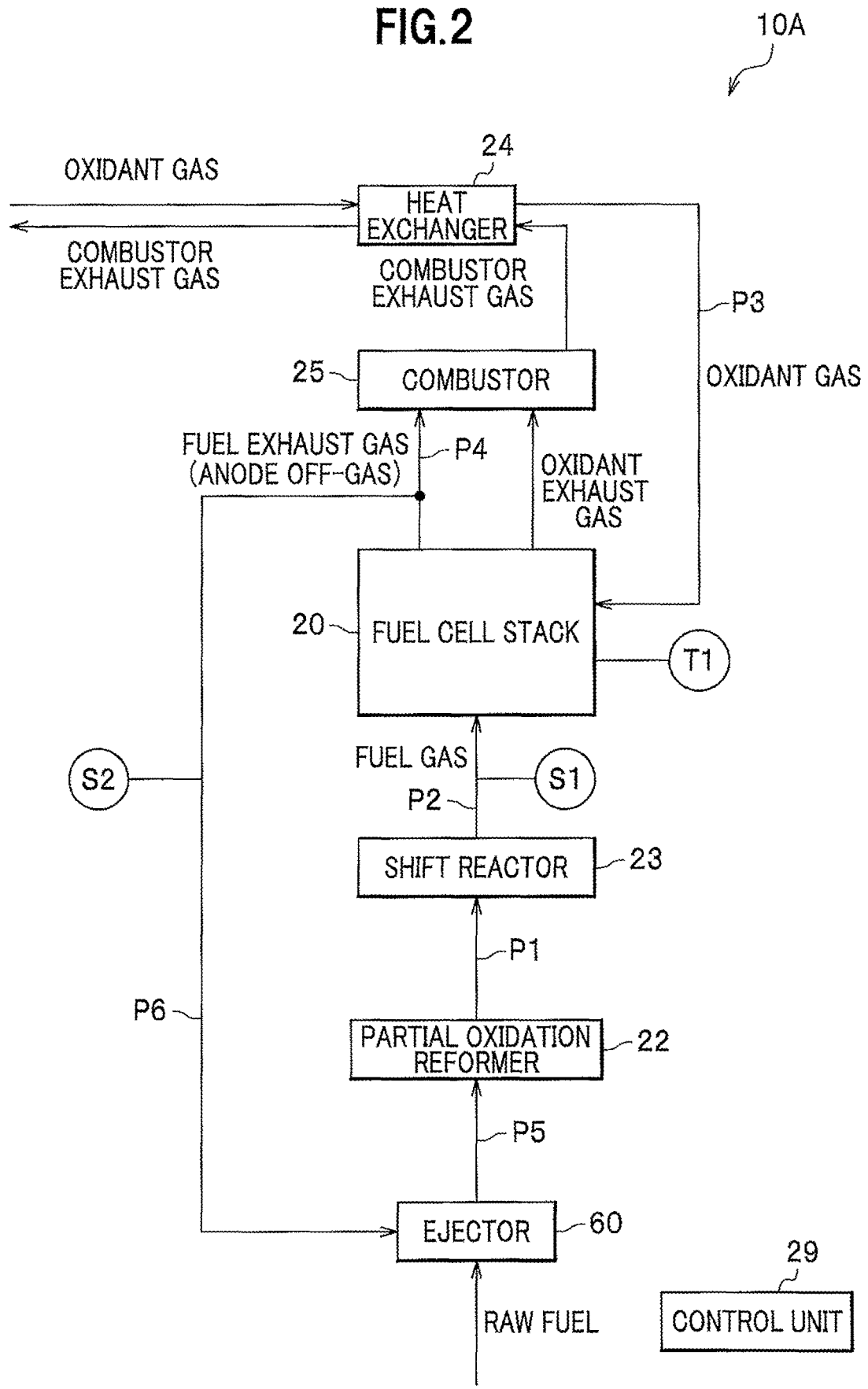
FIG. 2 is a configuration explanatory diagram of the fuel cell system according to the first embodiment of the present invention.

FIG. 1 is an external perspective view of a fuel cell system 10A according to a first embodiment of the present invention, and FIG. 2 is a configuration explanatory diagram of the fuel cell system 10A according to the first embodiment of the present invention. Note that, a fuel cell stack 20 is shown by imaginary lines (dashed lines) in FIG. 1. As shown in FIGS. 1 and 2, the fuel cell system 10A includes a planar fuel cell stack 20, a partial oxidation reformer 22, a shift reactor 23, a combustor 25, a heat exchanger 24, an exhaust gas recirculation pipe P6 (see FIG. 2) and a control unit 29 (see FIG. 2).

The fuel cell stack 20 includes a planar solid oxide fuel cell 30 for generating electric power by electrochemical reaction between oxygen in oxidant gas and hydrogen in fuel gas to be described later. Note that, as described below, the fuel gas in the present embodiment is a mixed gas containing hydrogen produced in the partial oxidation reformer 22 and the shift reactor 23, and the oxidant gas is air. Fuel cells 30 (see FIG. 1) in the present embodiment are stacked in a vertical direction Vt (see FIG. 1). End plates (not shown) are disposed at both ends in a stacking direction of the fuel cells 30.

The fuel cell 30 includes an electrolyte electrode assembly (MEA) provided with an anode electrode and a cathode electrode on both surfaces of electrolyte composed of oxide ion conductor such as stabilized zirconia.

Although not shown, an anode side separator and a cathode side separator are arranged on both sides of the electrolyte electrode assembly. An oxidant gas flow path for supplying the oxidant gas to the cathode electrode is formed in the cathode side separator, while a fuel gas flow path for supplying the fuel gas to the anode electrode is formed in the anode side separator.

The fuel cell 30 has a high operating temperature of several hundred degrees Celsius, and generates electric power by the electrochemical reaction between hydrogen supplied to the anode electrode and oxygen supplied to the cathode electrode, as described above. In particular, electrode reaction of the following equation (4) proceeds at the cathode electrode to which oxygen is supplied.

$$\tfrac{1}{2}O_2 + 2e^- \rightarrow O^{2-} \qquad \text{equation (4)}$$

Further, electrode reaction of the following equation (5) proceeds at the anode electrode by hydrogen to be supplied and $O^{2-}$ migrating from the cathode electrode side.

$$H_2 + O^{2-} \rightarrow H_2O + 2e^- \qquad \text{equation (5)}$$

Fuel exhaust gas (anode off-gas) discharged from the fuel cell stack 20 and oxidant exhaust gas are delivered to the combustor 25 to be described below. Incidentally, steam ($H_2O$) produced at the anode electrode is a component of the fuel exhaust gas (anode off-gas). In addition to the steam, this fuel exhaust gas (anode off-gas) contains carbon monoxide, carbon dioxide, hydrogen (unreacted hydrogen after the electrochemical reaction), which are produced in the partial oxidation reformer 22 and the shift reactor 23 to be described below, and unreformed hydrocarbons etc.

The oxidant exhaust gas contains unreacted oxygen which is contained in the air supplied as the oxidant gas, and nitrogen etc.

In FIG. 2, reference numeral T1 is a temperature sensor for detecting a temperature of the fuel cell stack 20. Although not shown, a stack heater for assisting warm-up of the fuel cell stack 20 can be provided in the fuel cell stack 20.

The partial oxidation reformer 22 is configured to carry out a partial oxidation reaction represented by the following equation (6) using raw fuel containing hydrocarbons as reaction components to produce reformed gas ($CO+H_2$), and to deliver this reformed gas to the shift reactor 23.

$$-CH_2-+\tfrac{1}{2}O_2 \rightarrow CO+H_2 \qquad \text{equation (6)}$$

As a partial oxidation reaction catalyst used in the partial oxidation reformer 22, there are, for example, Pt, Rh and Pd. A temperature of the partial oxidation reformer 22 is preferably about 500° C. to about 1000° C.

The raw fuel in the present embodiment is assumed to be, for example, city gas such as 13A mainly containing methane, and LPG mainly containing propane. Oxygen ($O_2$) used in the partial oxidation reaction in the present embodiment is supplied through a predetermined pipe (not shown) branching from a later-described oxidant gas supply pipe P3 for supplying the oxidant gas to the fuel cell stack 20.

The raw fuel is supplied to the partial oxidation reformer 22 through an ejector 60. The ejector 60 is provided in a raw fuel supply pipe P5 connecting the partial oxidation reformer 22 and a raw fuel pump (not shown). To this ejector 60, the exhaust gas recirculation pipe P6 to be described below is connected. Note that, the ejector 60 in the present embodiment has an electromagnetic needle valve (not shown). This electromagnetic needle valve adjusts a flow rate of the later described fuel exhaust gas (anode off-gas) flowing into the raw fuel supply pipe P5 through the exhaust gas recirculation pipe P6. However, it is also possible to adjust the flow rate of the fuel exhaust gas (anode off-gas) by providing a flow control vale (not shown) in the exhaust gas recirculation pipe P6.

The shift reactor 23 is configured to carry out the shift reaction of the following equation (7) reacting steam and carbon monoxide in the reformed gas produced in the partial oxidation reformer 22 to produce shift gas, and to deliver this shift gas to the fuel cell stack 20 (an anode electrode side).

$$CO+H_2O \rightarrow CO_2+H_2 \qquad \text{equation (7)}$$

As a shift reaction catalyst used in the shift reactor 23, there are, for example, Cu—Zn based catalyst, Fe—Cr based catalyst and Pt based catalyst. A temperature of the shift reactor 23 is preferably about 250° C. to about 550° C. In FIG. 2, reference numeral P1 is a reformed gas supply pipe for connecting the partial oxidation reformer 22 and the shift reactor 23, and reference numeral P2 is a fuel gas supply pipe for connecting the shift reactor 23 and the fuel cell stack 20 (an anode electrode side inlet). Reference numeral S1 is a carbon monoxide concentration sensor (hereinafter, simply referred to as a "CO sensor S1") provided in the fuel gas supply pipe P2.

Note that, in addition to hydrogen ($H_2$) produced in the partial oxidation reformer 22 and shift gas ($CO_2+H_2$) produced in the shift reactor 23, a mixed gas containing trace components such as steam ($H_2O$), carbon monoxide (CO) unreacted in the shift reactor 23, and raw fuel (hydrocarbons) unreformed in the partial oxidation reformer 22 pass through the fuel gas supply pipe P2. This mixed gas corresponds to the fuel gas in the present embodiment described above. The CO sensor S1 detects a carbon monoxide concentration (hereinafter, simply referred to as a "CO concentration") in this fuel gas.

The combustor 25 is configured to combust unreacted hydrogen contained in the fuel exhaust gas (anode off-gas) discharged from the fuel cell stack 20. Further, the combustor 25 also combusts unreformed raw fuel (hydrocarbon) and carbon monoxide not converted to carbon dioxide in the shift reactor 23. For this combustion, the oxidant exhaust gas supplied to the combustor 25 from the fuel cell stack 20 is used. Incidentally, the oxidant exhaust gas contains a sufficient amount of oxygen for this combustion. Combustor exhaust gas of the combustor 25 contains the oxidant exhaust gas (air components) in addition to steam and carbon dioxide which are respectively combustion products of hydrogen and carbon monoxide. The combustor exhaust gas discharged from the combustor 25 is discharged out of the fuel cell system 10A through the heat exchanger 24 to be described next.

The heat exchanger 24 heats the oxidant gas by heat-exchanging the oxidant gas supplied to the fuel cell stack 20 with the combustor exhaust gas delivered from the combustor 25. Note that, air in the atmosphere is fed to the heat exchanger 24 as the oxidant gas by an air supply pump (not shown). Further, the oxidant gas heat-exchanged in the heat exchanger 24 is supplied to the fuel cell stack 20 (a cathode electrode side inlet) through the oxidant gas supply pipe P3.

The exhaust gas recirculation pipe P6 branches from an anode off-gas outlet pipe P4 of the fuel cell stack 20 to be connected to the ejector 60. The exhaust gas recirculation pipe P6 feeds a part of the fuel exhaust gas (anode off-gas) to the raw fuel supply pipe P5 through the ejector 60, so as to supply the steam contained in the fuel exhaust gas (anode off-gas) to the shift reactor 23. The shift reaction proceeds with this steam. In FIG. 2, reference numeral S2 is a humidity sensor provided in the exhaust gas recirculation pipe P6.

The control unit 29 is an electronic unit including a CPU, a memory and the like, and executes a control program stored in a storage unit such as the memory by the CPU. The control unit 29 in the present embodiment detects the CO concentration in the fuel gas by the CO sensor S1, detects the temperature of the fuel cell stack 20 by the temperature sensor T1, and detects humidity of the fuel exhaust gas (anode off-gas) flowing through the exhaust gas recirculation pipe P6 by the humidity sensor S2. As described below, the control unit 29 is configured to control the flow rate of the fuel exhaust gas (anode off-gas) flowing through the exhaust gas recirculation pipe P6 based on these detected values.

Next, an operation of the fuel cell system 10A of the present embodiment and operational effect of the fuel cell system 10A will be described with reference to FIG. 2. During activation of the fuel cell system 10A, the air as the oxidant gas is supplied to the oxidant gas supply pipe P3 by the air supply pump (not shown). A part of the air is also supplied to the partial oxidation reformer 22 through a predetermined path.

Further, the raw fuel is supplied to the ejector 60 from a raw fuel supply pump (not shown). The ejector 60 feeds the raw fuel of a predetermined flow rate to the partial oxidation reformer 22. In the partial oxidation reformer 22, the partial oxidation reaction proceeds with hydrocarbons contained in the raw fuel and oxygen in the air fed through the predetermined path to produce the reformed gas. The reformed gas produced has a high temperature due to reaction heat of the partial oxidation reaction. The shift reactor 23 and the fuel cell stack 20, which are disposed downstream of the partial oxidation reformer 22, are heated by the reformed gas flowing therethrough to be warmed up. Note that, warm-up of the fuel cell stack 20 can also be performed by the stack heater (not shown).

The oxidant gas is supplied to the fuel cell stack 20 through the oxidant gas supply pipe P3. Before warm-up of the fuel cell stack 20 is completed, the fuel gas supplied to the fuel cell stack 20 is not used for power generation (remains unreacted), but is fed to the combustor 25 together with the oxidant gas supplied to the fuel cell stack 20 to be combusted.

The combustion exhaust gas delivered from the combustor 25 is fed to the heat exchanger 24 and is heat-exchanged with the oxidant gas separately fed to the heat exchanger 24. Thus, the oxidant gas flowing through the oxidant gas supply pipe P3 is heated to a predetermined temperature and then supplied to the fuel cell stack 20.

When it is determined that warm-up of the fuel cell stack 20 is completed by the temperature sensor T1, the control unit 29 electrically connects the fuel cell stack 20 with, for example, an external load such as a secondary battery. Thus, the fuel cell stack 20 starts power generation. In the anode electrode and the cathode electrode of the fuel cell stack 20, the electrode reactions described above proceed.

Further, the control unit 29 monitors the CO concentration contained in the fuel gas flowing through the fuel gas supply pipe P2 by the CO sensor S1. When the CO concentration detected by the CO sensor S1 exceeds a preset threshold value, the control unit 29 determines that there is a possibility of carbon deposition in the fuel cell stack 20. Incidentally, this threshold value is determined by a map obtained in advance on a relationship between the CO concentration and carbon deposition in the fuel cell stack 20, and the control unit 29 makes the above-described determination with reference to a memory in which such a map is stored.

When it is determined that the CO concentration exceeds the threshold value, the control unit 29 adjusts an opening degree of the electromagnetic needle valve (not shown) in the ejector 60. In particular, the control unit 29 opens the electromagnetic needle valve (not shown) so that an amount of steam supplied to the shift reactor 23 is increased. Thus, the shift reaction represented by "$CO+H_2O \rightarrow CO_2+H_2$" is sufficiently carried out in the shift reactor 23, and remaining CO in the shift reactor 23 is consumed. As a result, the CO concentration contained in the fuel gas supplied to the fuel cell stack 20 is reduced, and carbon deposition in the fuel cell stack 20 is avoided.

Further, unreacted hydrogen, carbon monoxide, unreformed raw fuel and the like contained in the fuel exhaust gas (anode off-gas) flowing through the exhaust gas recirculation pipe P6 are again supplied to the partial oxidation reformer 22 and the shift reactor 23, and thus power generation efficiency of the fuel cell stack 20 is improved.

Further, the control unit 29 monitors the temperature of the fuel cell stack 20, which is changed according to an amount of power generation, by the temperature sensor T1. The control unit 29 calculates an amount of fuel gas required in accordance with the amount of power generation based on the temperature of the fuel cell stack 20. This calculation is performed with reference to a memory storing a map obtained in advance on a relationship between the temperature of the fuel cell stack 20 and the amount of fuel gas required.

Furthermore, the control unit 29 calculates an amount of water (steam) required in the shift reactor 23 when producing the amount of fuel gas calculated. This calculation is performed based on stoichiometric calculation of the partial oxidation reaction and the shift reaction.

Meanwhile, the control unit 29 determines an amount of water in the fuel exhaust gas (anode off-gas) flowing through the exhaust gas recirculation pipe P6 by the humidity sensor S2. Based on this amount of water, the control unit 29 calculates the flow rate of the fuel exhaust gas (anode off-gas) in the exhaust gas recirculation pipe P6 in order to ensure the amount of water (steam) required in the shift reactor 23.

The control unit 29 opens the electromagnetic needle valve (not shown) of the ejector 60 so that the flow rate of the fuel exhaust gas (anode off-gas) in the exhaust gas recirculation pipe P6 is the calculated flow rate. Thus, the shift reaction in the shift reactor 23 is sufficiently carried out, and the CO concentration contained in the fuel gas supplied to the fuel cell stack 20 is reduced, so that carbon deposition in the fuel cell stack 20 can be avoided.

In the fuel cell system 10A of the present embodiment, a percentage (100Q2/Q1) of a flow rate Q2 of the fuel exhaust gas (anode off-gas) in the exhaust gas recirculation pipe P6 to a flow rate Q1 of the anode off-gas discharged from the fuel cell stack 20, that is, a return rate is preferably set to about 10% to 30%.

Note that, as described above, the calculation of the amount of power generation of the fuel cell stack 20 by the control unit 29 in the present embodiment is performed based on the temperature of the fuel cell stack 20, however, it is also possible to calculate the amount of power generation based on a voltage value or a current value during normal operation of the fuel cell stack 20.

Modification of First Embodiment

Figure 3:
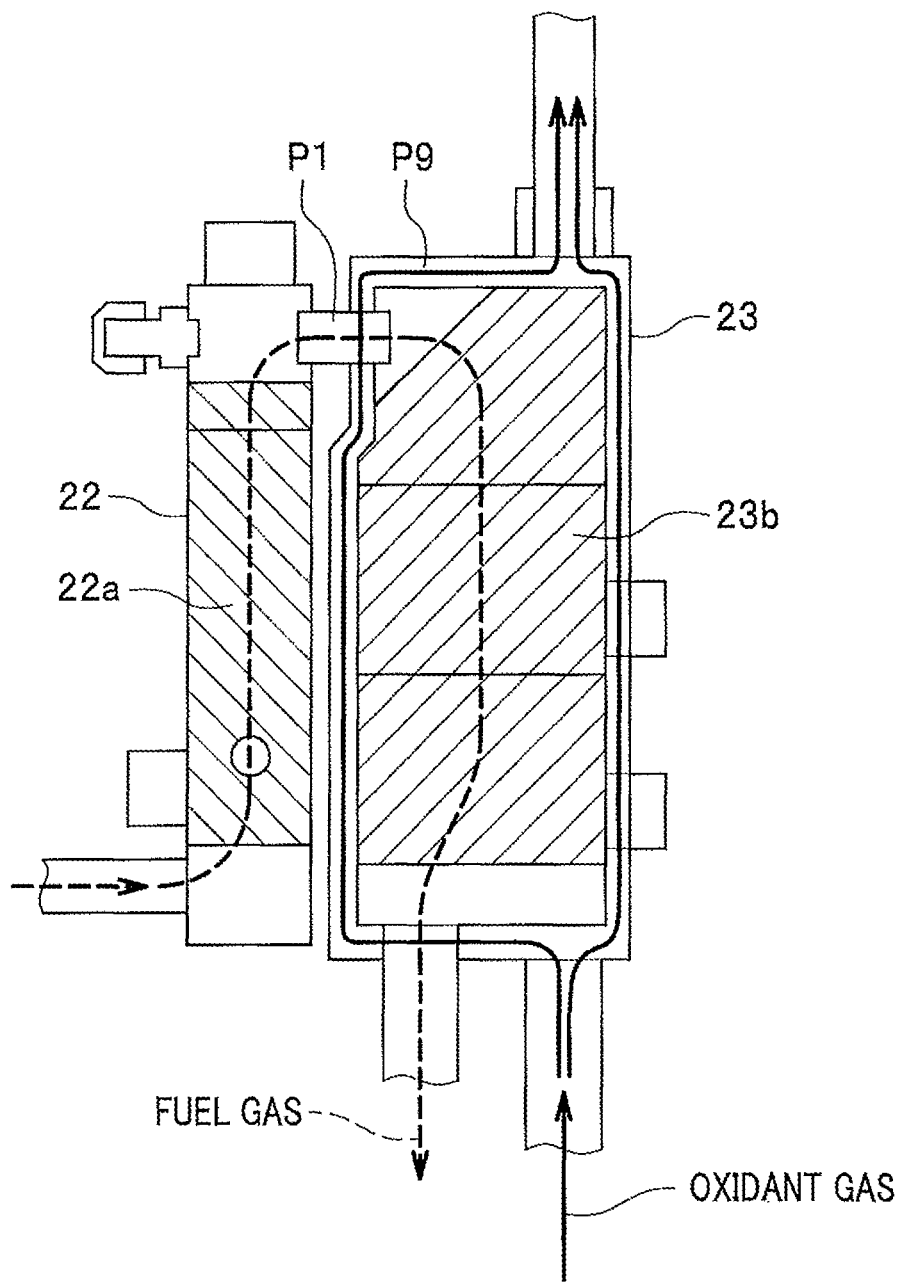
FIG. 3 is a configuration explanatory diagram of a partial oxidation reformer and a shift reactor used in a modification of the first embodiment.

FIG. 3 is a configuration explanatory diagram of the partial oxidation reformer 22 and the shift reactor 23 used in a modification of the first embodiment. As shown in FIG. 1, the partial oxidation reformer 22 and the shift reactor 23 are arranged adjacent to each other.

As shown in FIG. 3, the raw fuel and the oxidant gas are supplied to the partial oxidation reformer 22 having a partial oxidation reaction catalyst 22a therein to produce the reformed gas as described above. The reformed gas is fed to the shift reactor 23 having a shift reaction catalyst 23b therein through the reformed gas supply pipe P1. As described above, in the shift reactor 23, the shift reaction proceeds to deliver the fuel gas.

In this modification, an oxidant gas supply path P9 for partial oxidation (hereinafter, referred to as a POX oxidant gas supply path P9) for supplying the oxidant gas to the partial oxidation reformer 22 is disposed to be in thermal contact with the shift reaction catalyst 23b in the shift reactor 23 (to be able to exchange heat with the shift reaction catalyst 23b). In particular, the POX oxidant gas supply path P9 is disposed adjacent to the outside of the shift reaction catalyst 23 incorporated in the shift reactor 23. That is, in this modification, the POX oxidant gas supply path P9 is disposed close to the shift reactor 23 so that the oxidant gas (air) flowing through the POX oxidant gas supply path P9 can cool the shift reactor 23 by heat exchange with the shift reactor 23.

With this modification, the shift reaction catalyst 23b is cooled by the oxidant gas for partial oxidation flowing through the POX oxidant gas supply path P9. A temperature of the shift reaction catalyst 23b is preferably set to about 350° C. to 550° C. Thus, the shift reaction proceeds efficiently in the shift reactor 23. Further, the oxidant gas for partial oxidation is heated by heat exchange with the shift reaction catalyst 23b to be supplied to the partial oxidation reformer 22. Thus, the partial oxidation reaction proceeds efficiently in the partial oxidation reformer 22. Carbon deposition in the fuel cell stack 20 is more effectively prevented as compared with the first embodiment. Power generation efficiency of the fuel cell stack 20 is also further improved.

Second Embodiment

Figure 4:
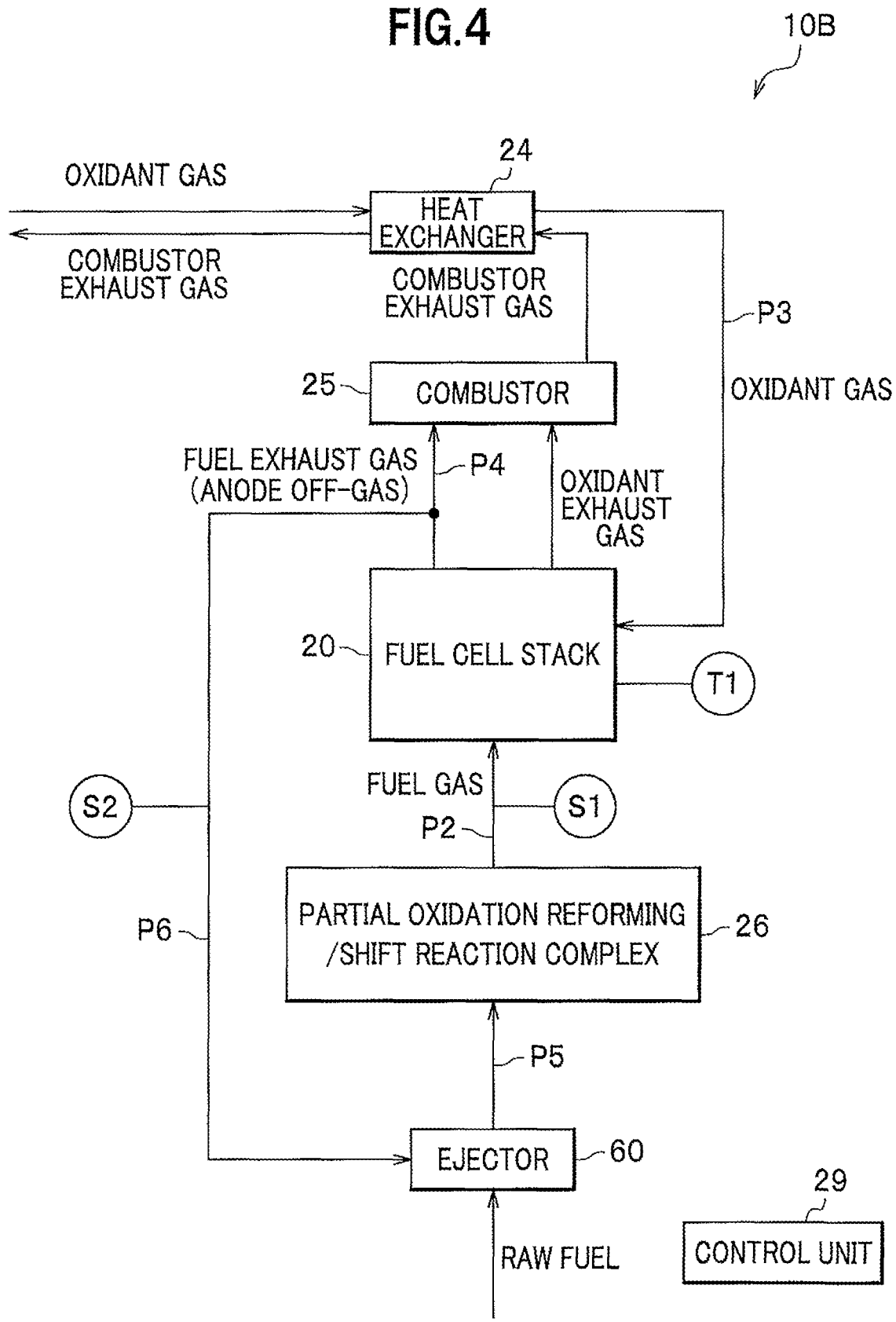
FIG. 4 is a configuration explanatory diagram of a fuel cell system according to a second embodiment of the present invention.

FIG. 4 is a configuration explanatory diagram of a fuel cell system 10B according to a second embodiment of the present invention. In the present embodiment, the same components as those of the first embodiment are denoted by the same reference numerals, and a detailed description thereof will be omitted.

As shown in FIG. 4, in the fuel cell system 10B of the present embodiment, the partial oxidation reformer 22 (see FIG. 2) and the shift reactor 23 (see FIG. 2) in the first embodiment are integrally formed to constitute a partial oxidation reforming/shift reaction complex 26. The partial oxidation reforming/shift reaction complex 26 has the partial oxidation reaction catalyst and the shift reaction catalyst in a housing thereof, and the reformed gas supply pipe P1 (see FIG. 2) is removed. With this fuel cell system 10B according to the second embodiment, it is possible to obtain the same operational effect as that of the fuel cell system 10A according to the first embodiment, and to reduce the size of the system.

Third Embodiment

Figure 5:
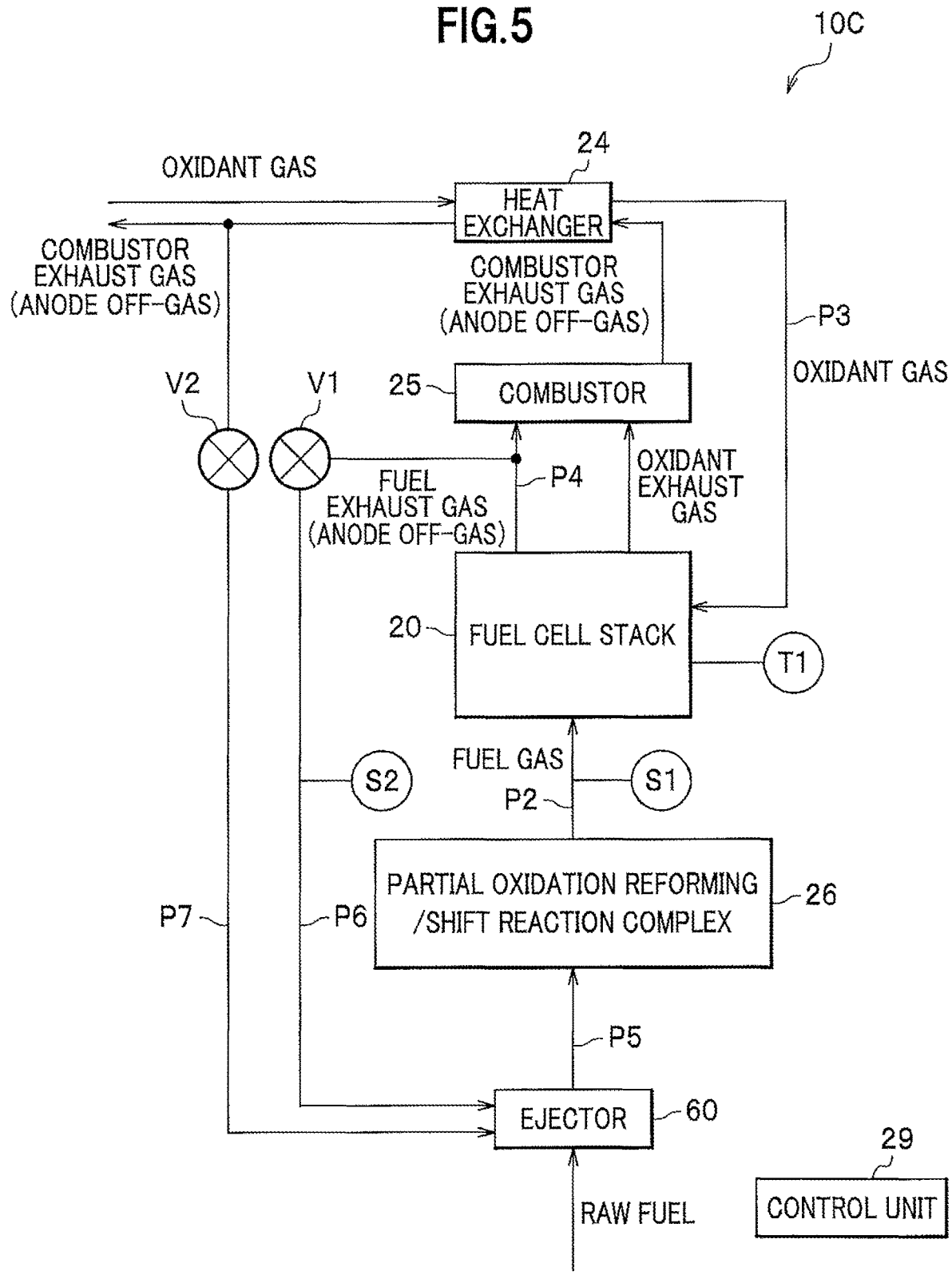
FIG. 5 is a configuration explanatory diagram of a fuel cell system according to a third embodiment of the present invention.

FIG. 5 is a configuration explanatory diagram of a fuel cell system 10C according to a third embodiment of the present invention. In the present embodiment, the same components as those of the first embodiment and the second embodiment are denoted by the same reference numerals, and a detailed description thereof will be omitted.

As shown in FIG. 5, the fuel cell system 10C according to the present embodiment is different from the fuel cell system 10B (see FIG. 4) according to the second embodiment, and is provided with an exhaust gas recirculation pipe P7 (hereinafter, may be referred to as a second exhaust gas recirculation pipe) for feeding the combustor exhaust gas discharged from the heat exchanger 24 to the ejector 60 in addition to the exhaust gas recirculation pipe P6 (hereinafter, may be referred to as a first exhaust gas recirculation pipe). In FIG. 5, reference numerals V1, V2 are electromagnetic on-off valves respectively provided in the exhaust gas recirculation pipes P6, P7. Note that, in FIG. 5, a phrase "ANODE OFF-GAS" in a parenthesis attached to the combustor exhaust gas means that the anode off-gas is contained in the combustor exhaust gas.

In the fuel cell system 10B (see FIG. 4) according to the second embodiment, power generation is not performed in the fuel cell stack 20 during warm-up of the fuel cell stack 20 (see FIG. 4). That is, since the fuel exhaust gas (anode off-gas) containing steam is not supplied to the ejector 60, the shift reaction does not proceed in the shift reactor 23, and the fuel gas rich in carbon monoxide (CO) as compared with that after completion of warm-up is supplied to the fuel cell stack 20.

In contrast, in the fuel cell system 10C according to the present embodiment, as shown in FIG. 5, the combustor exhaust gas containing steam is supplied to the ejector 60 through the exhaust gas recirculation pipe P7 during warm-up of the fuel cell stack 20. That is, the shift reaction proceeds in the partial oxidation reforming/shift reaction complex 26 even during warm-up of the fuel cell stack 20.

Further, the fuel cell stack 20 can generate electric power after completion of warm-up, and can use both the steam generated in the combustor 25 and the steam contained in the anode off-gas for the shift reaction in the partial oxidation reforming/shift reaction complex 26.

Further, in the fuel cell system 10C, the control unit 29 can be configured to set the electromagnetic on-off valve V1 to a closed state and the electromagnetic on-off valve V2 to an open state during warm-up of the fuel cell stack 20. Then, the control unit 29 can also be configured to set the electromagnetic on-off valve V1 to an open state and the electromagnetic on-off valve V2 to a closed state after completion of warm-up of the fuel cell stack 20. That is, the fuel cell system 10C can be configured to use the steam contained in the combustor exhaust gas for the shift reaction during warm-up of the fuel cell stack 20, and to use the steam contained in the anode off-gas for the shift reaction after completion of warm-up of the fuel cell stack 20.

With this fuel cell system 10C, it is possible to obtain the same operational effect as that of the fuel cell system 10A according to the first embodiment, and to reduce the CO concentration contained in the fuel gas even during warm-up of the fuel cell stack 20, thereby more reliably preventing carbon deposition in the fuel cell stack 20.

Fourth Embodiment

Figure 6:
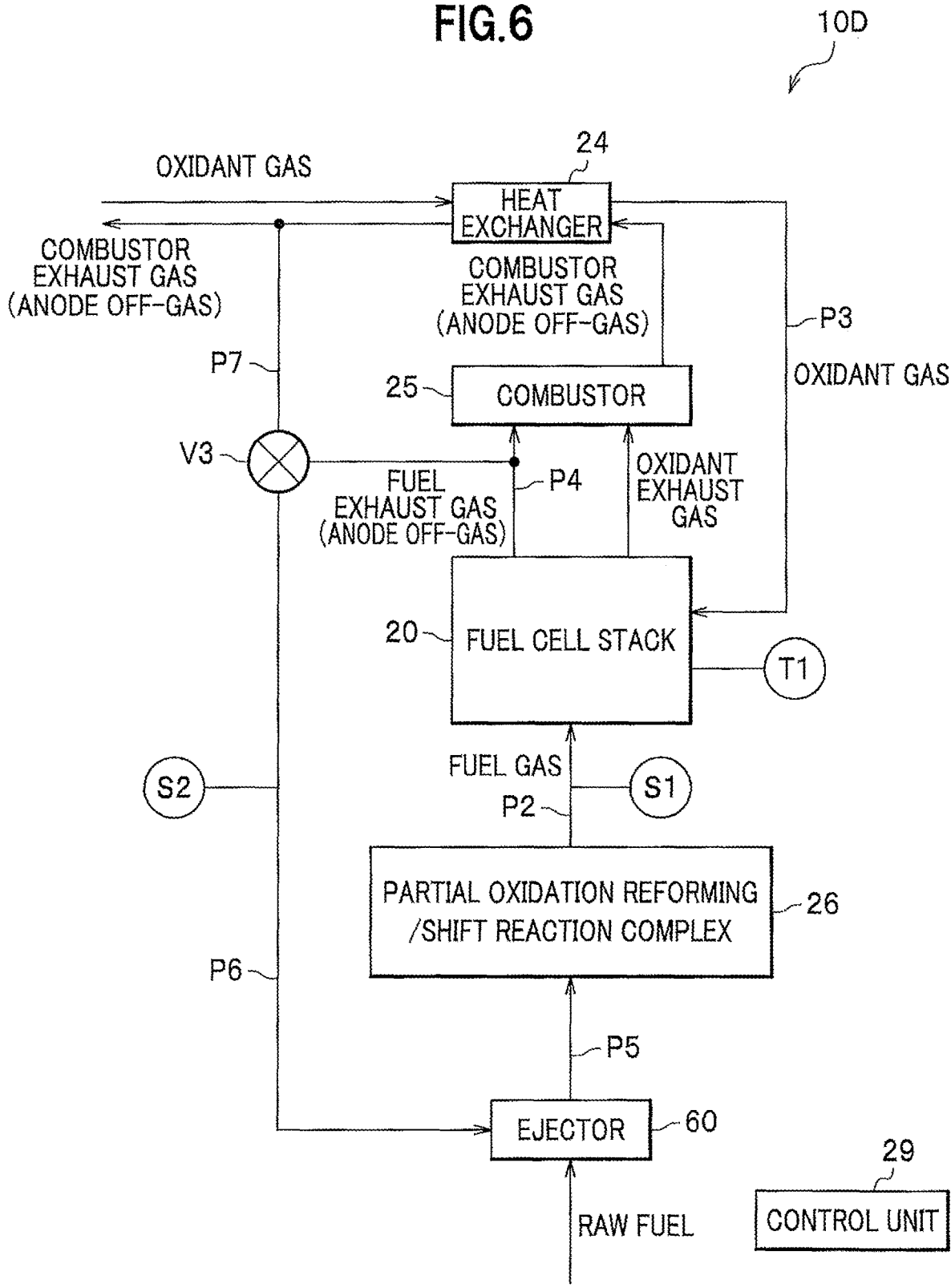
FIG. 6 is a configuration explanatory diagram of a fuel cell system according to a fourth embodiment of the present invention.

FIG. 6 is a configuration explanatory diagram of a fuel cell system 10D according to a fourth embodiment of the present invention. In the present embodiment, the same components as those of the first embodiment to the third embodiment are denoted by the same reference numerals, and a detailed description thereof will be omitted.

As shown in FIG. 6, the fuel cell system 10D according to the present embodiment is different from the fuel cell system 10C (see FIG. 5) according to the third embodiment, and the exhaust gas recirculation pipe P7 as the second exhaust gas recirculation pipe is joined to a middle of the exhaust gas recirculation pipe P6 as the first exhaust gas recirculation pipe. Then, an electromagnetic flow path switching valve V3 is disposed at this joining position.

In the fuel cell system 10D according to the present embodiment, the control unit 29 is configured to set the electromagnetic flow path switching valve V3 so that the combustor exhaust gas flows through the ejector 60 during warm-up of the fuel cell stack 20, and to set the electromagnetic flow path switching valve V3 so that the fuel exhaust gas flows through the ejector 60 after completion of warm-up of the fuel cell stack 20. Note that, in FIG. 6, a phrase "ANODE OFF-GAS" in a parenthesis attached to the combustor exhaust gas means that the anode off-gas is contained in the combustor exhaust gas.

With this fuel cell system 10D, it is possible to obtain the same operational effect as that of the fuel cell system 10C according to the third embodiment, and to shorten the exhaust gas recirculation pipe P7, while it is possible to replace two electromagnetic on-off valves V1, V2 with a single electromagnetic flow path switching valve V3, thereby reducing the size of the system.

Fifth Embodiment

Figure 7:
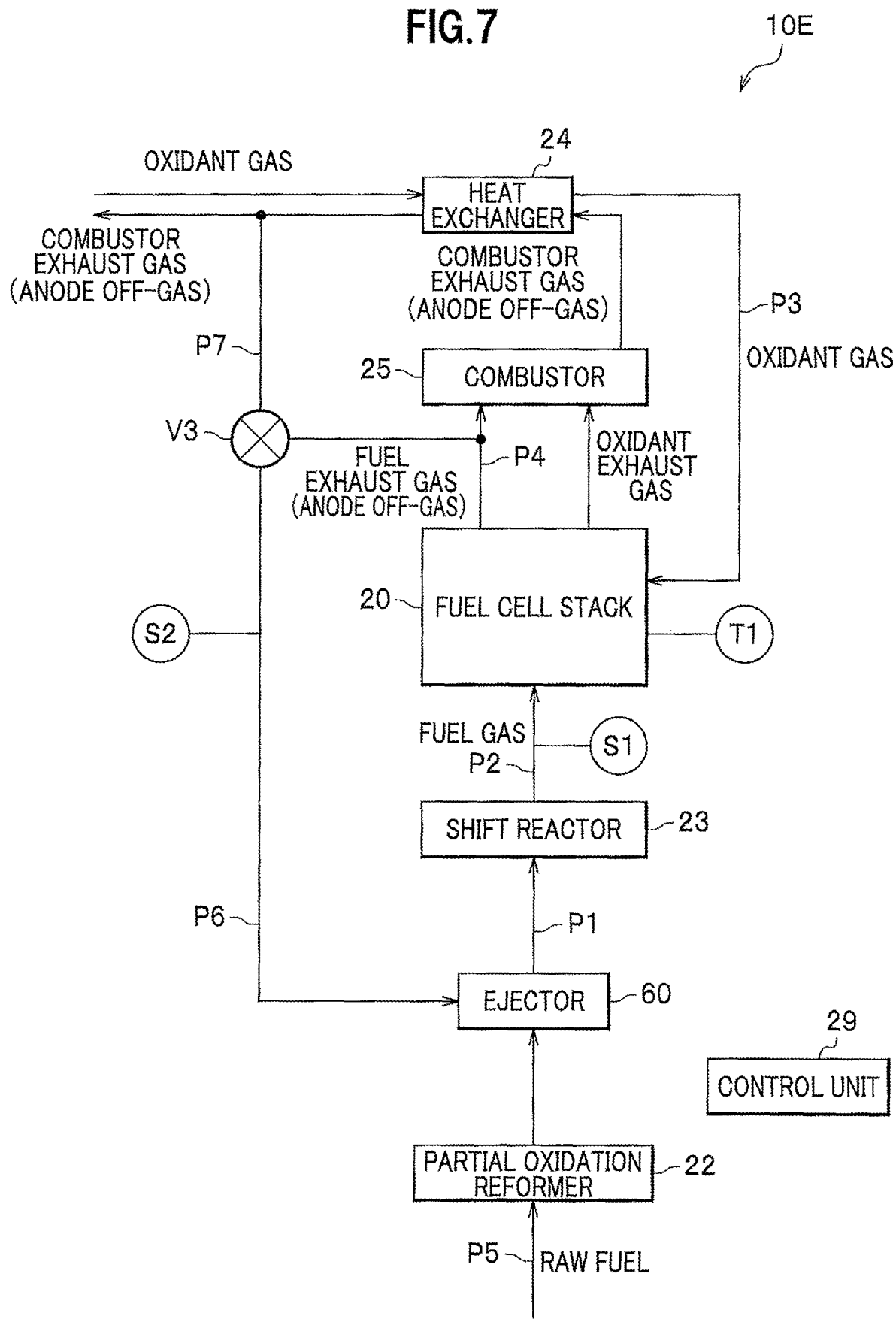
FIG. 7 is a configuration explanatory diagram of a fuel cell system according to a fifth embodiment of the present invention.

FIG. 7 is a configuration explanatory diagram of a fuel cell system 10E according to a fifth embodiment of the present invention. In the present embodiment, the same components as those of the first embodiment to the fourth embodiment are denoted by the same reference numerals, and a detailed description thereof will be omitted.

As shown in FIG. 7, the fuel cell system 10E according to the present embodiment is different from the fuel cell system 10D (see FIG. 6) according to the fourth embodiment, and is configured such that the partial oxidation reforming/shift reaction complex 26 (see FIG. 6) is divided into the partial oxidation reformer 22 and the shift reactor 23. Further, the fuel cell system 10E is different from the fuel cell system 10A (see FIG. 2) according to the first embodiment, and the ejector 60 is disposed between the partial oxidation reformer 22 and the shift reactor 23. Note that, in FIG. 7, a phrase "ANODE OFF-GAS" in a parenthesis attached to the combustor exhaust gas means that the anode off-gas is contained in the combustor exhaust gas.

In this fuel cell system 10E, it is possible feed the fuel exhaust gas or the combustor exhaust gas containing the steam to immediately upstream of the shift reactor 23.

With this fuel cell system 10E, it is possible to obtain the same operational effect as that of the fuel cell system 10D according to the fourth embodiment, and to directly feed the steam to the shift reactor 23, so that the shift reaction proceeds more efficiently. Thus, it is possible to more reliably reduce the CO concentration contained in the fuel gas, thereby more reliably preventing carbon precipitation in the fuel cell stack 20.

Sixth Embodiment

Figure 8:
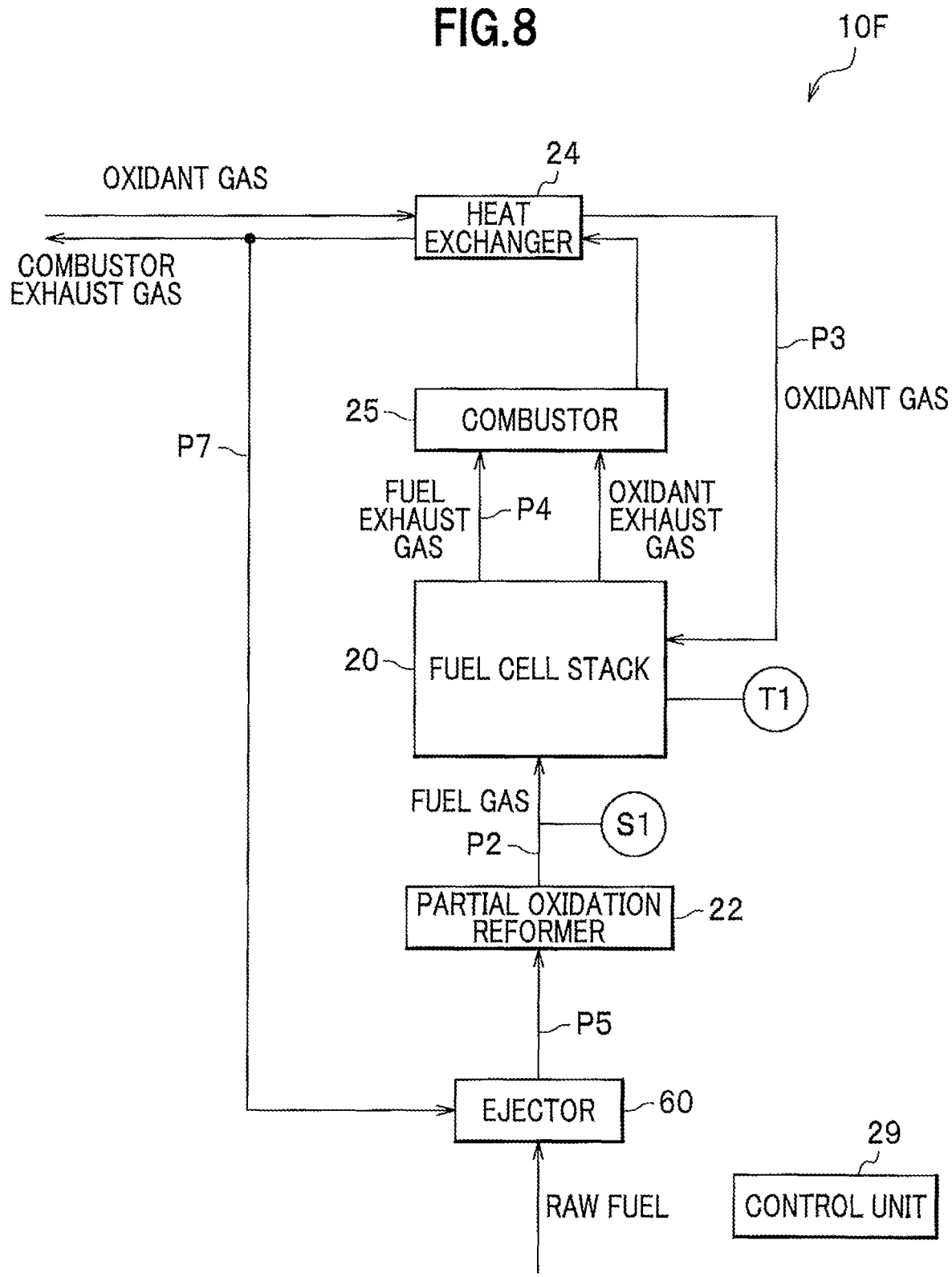
FIG. 8 is a configuration explanatory diagram of a fuel cell system according to a sixth embodiment of the present invention.

FIG. 8 is a configuration explanatory diagram of a fuel cell system 10F according to a sixth embodiment of the present invention. In the present embodiment, the same components as those of the first embodiment to the fifth embodiment are denoted by the same reference numerals, and a detailed description thereof will be omitted.

As shown in FIG. 8, the fuel cell system 10F according to the present embodiment is different from the fuel cell system 10A (see FIG. 2) according to the first embodiment, and the shift reactor 23 is removed. Further, the fuel cell system 10F includes the exhaust gas recirculation pipe P7 for feeding the combustor exhaust gas containing the oxidant gas composed of air components to the ejector 60.

In this fuel cell system 10F, similarly to the fuel cell system 10A according to the first embodiment, the control unit 29 determines that there is a possibility of carbon deposition in the fuel cell stack 20 when the CO concentration detected by the CO sensor S1 exceeds the preset threshold value. When it is determined that the CO concentration exceeds the preset threshold value, the control unit 29 adjusts the opening degree of the electromagnetic needle valve (not shown) in the ejector 60. In particular, the control unit 29 feeds the combustor exhaust gas to the ejector 60 so as to reduce the CO concentration contained in the fuel gas supplied to the fuel cell stack 20. The CO concentration contained in the fuel gas is reduced in this manner, and thus carbon deposition in the fuel cell stack 20 is avoided.

Although the embodiments of the present invention have been described above, the present invention is not limited to the embodiments described above, and various modifications can be made without departing from the scope of the present invention. Although the fuel cell systems 10A to 10F according to the embodiments are assumed to be stationary type systems, they can also be used for a moving vehicle such as a ship. Further, although the fuel cell systems 10A to 10F according to the embodiments are assumed to use fuel containing hydrocarbon such as LPG or city gas as the raw fuel, it is also possible to use other compounds (for example, low molecular weight organic compounds such as alcohols), which contains carbon atoms and hydrogen atoms and is vaporizable at a predetermined temperature, as the raw fuel. Furthermore, although the fuel cell systems 10A to 10F according to the embodiments are assumed to be systems including a solid oxide fuel cell as a component, it can also include other fuel cells such as a solid polymer fuel cell, a molten carbonate fuel cell and a phosphoric acid fuel cell as the component. In this case, water-containing off-gas is recirculated to the shift reactor according to electrode reactions of various fuel cells.

EXAMPLE

Next, an example verifying the operational effect of the fuel cell system 10A (see FIG. 2) according to the first embodiment will be described below. In this example, carbon deposition start temperature in the fuel cell stack 20 of the fuel cell system 10A (see FIG. 2) according to the first embodiment is verified.

In this example, the return rate defined by the percentage (100Q2/Q1) of the flow rate Q2 of the fuel exhaust gas (anode off-gas) in the exhaust gas recirculation pipe P6 to the flow rate Q1 of the anode off-gas discharged from the fuel cell stack 20 is set to 20%, 30% and 40%, respectively. The carbon deposition start temperature in each return rate is calculated by chemical equilibrium calculation of carbon deposition ($2CO \Leftrightarrow CO_2 + C$) in each return rate.

Figure 9:
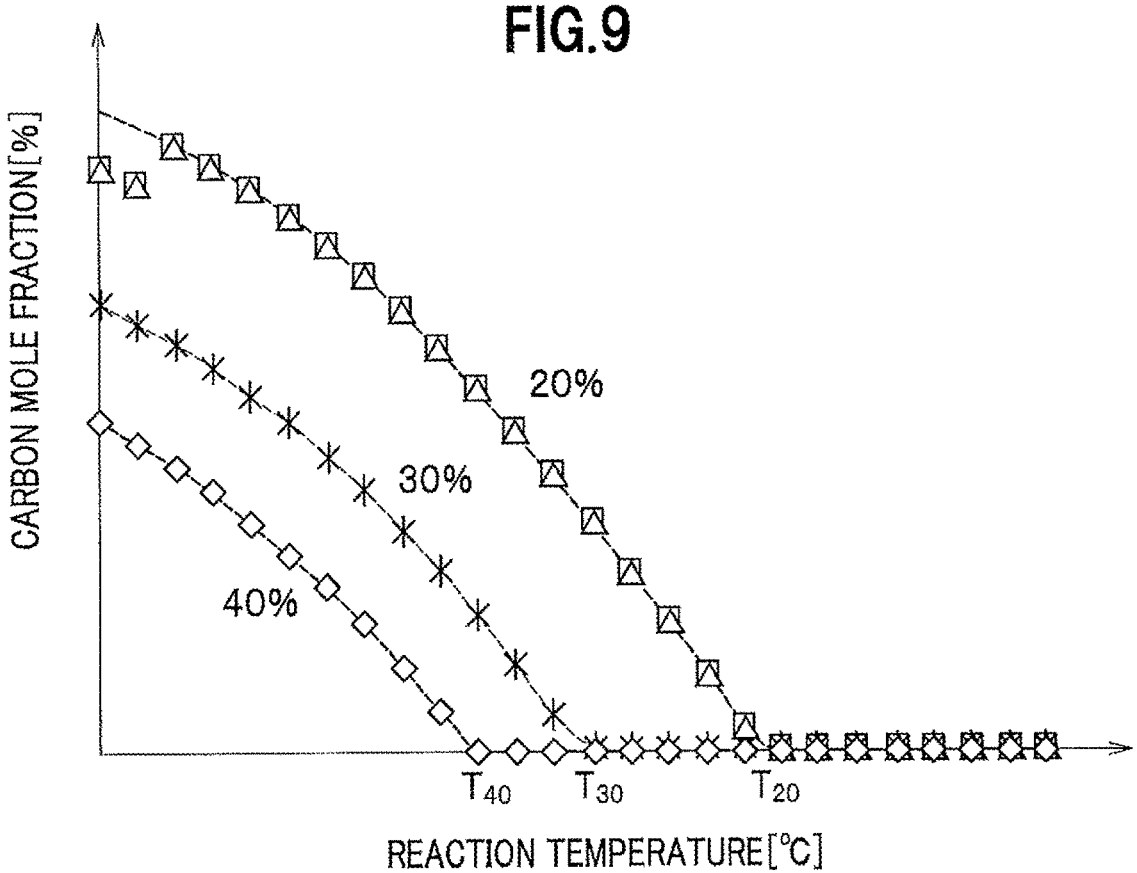
FIG. 9 is a graph showing carbon deposition start temperatures when a return rate is respectively set to 20%, 30% and 40% in the fuel cell system according to the first embodiment of the present invention.

The result is shown in FIG. 9. FIG. 9 is a graph showing carbon deposition start temperatures $T_{20}$, $T_{30}$ and $T_{40}$ when the return rate is respectively set to 20%, 30% and 40%. The vertical axis of the graph is carbon mole fraction and the horizontal axis is reaction temperature.

As shown in FIG. 9, it is confirmed that the carbon deposition start temperature is reduced to $T_{20}°$ C., $T_{30}°$ C. and $T_{40}°$ C. as the return rate increases to 20%, 30% and 40%. That is, in the fuel cell system 10A (see FIG. 2) according to the first embodiment, it is verified that the system can be operated without carbon deposition in the fuel cell stack 20 at lower temperature as the return rate is increased.

Further, in this example, in the fuel cell system 10A (see FIG. 2) according to the first embodiment, power generation efficiencies of the fuel cell stack 20 are calculated when the return rate is respectively set to 10%, 20% and 30%.

Figure 10:
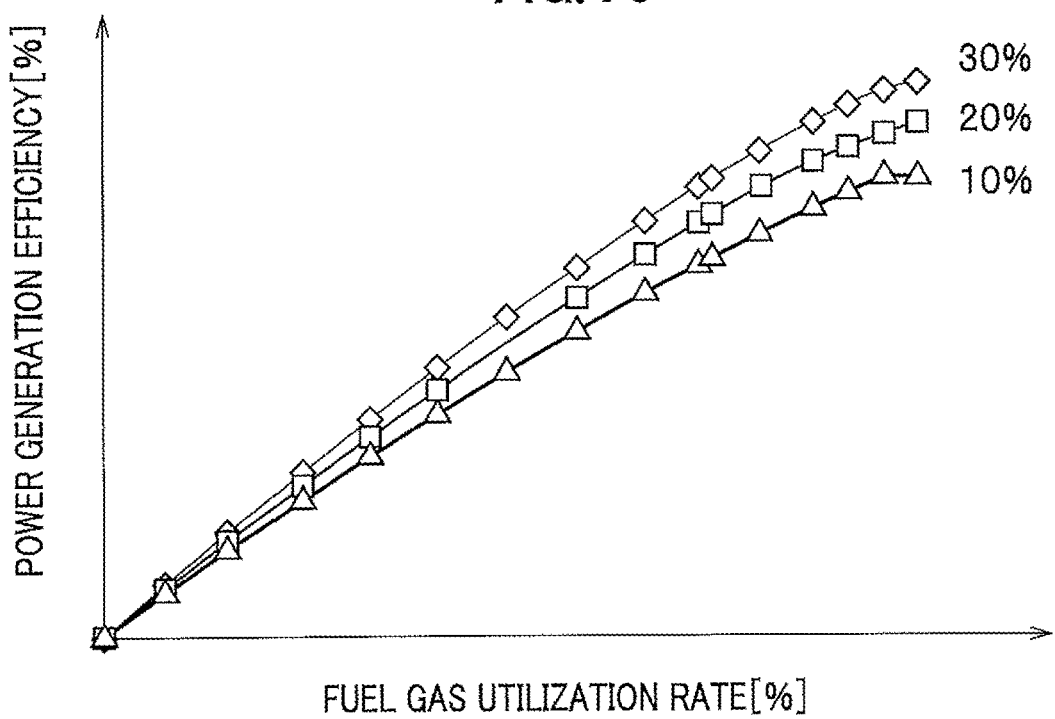
FIG. 10 is a graph showing power generation efficiencies when the return rate is respectively set to 10%, 20% and 30% in the fuel cell system according to the first embodiment of the present invention.

The result is shown in FIG. 10. FIG. 10 is a graph showing the power generation efficiencies when the return rate is respectively set to 10%, 20% and 30%. The vertical axis of the graph is power generation efficiency of the fuel cell stack 20 and the horizontal axis is fuel gas utilization rate. As shown in FIG. 10, it is confirmed that the power generation efficiency is increased as the return rate is increased to 10%, 20%, and 30%.

Further, in this example, temperature dependency of the shift reaction in the shift reactor 23 (see FIG. 2) of the fuel cell system 10A (see FIG. 2) according to the first embodiment is verified. In particular, the temperature of the shift reactor 23 (see FIG. 2) and a CO concentration and a hydrogen concentration after the shift reaction in the shift reactor 23 are calculated.

Figure 11:
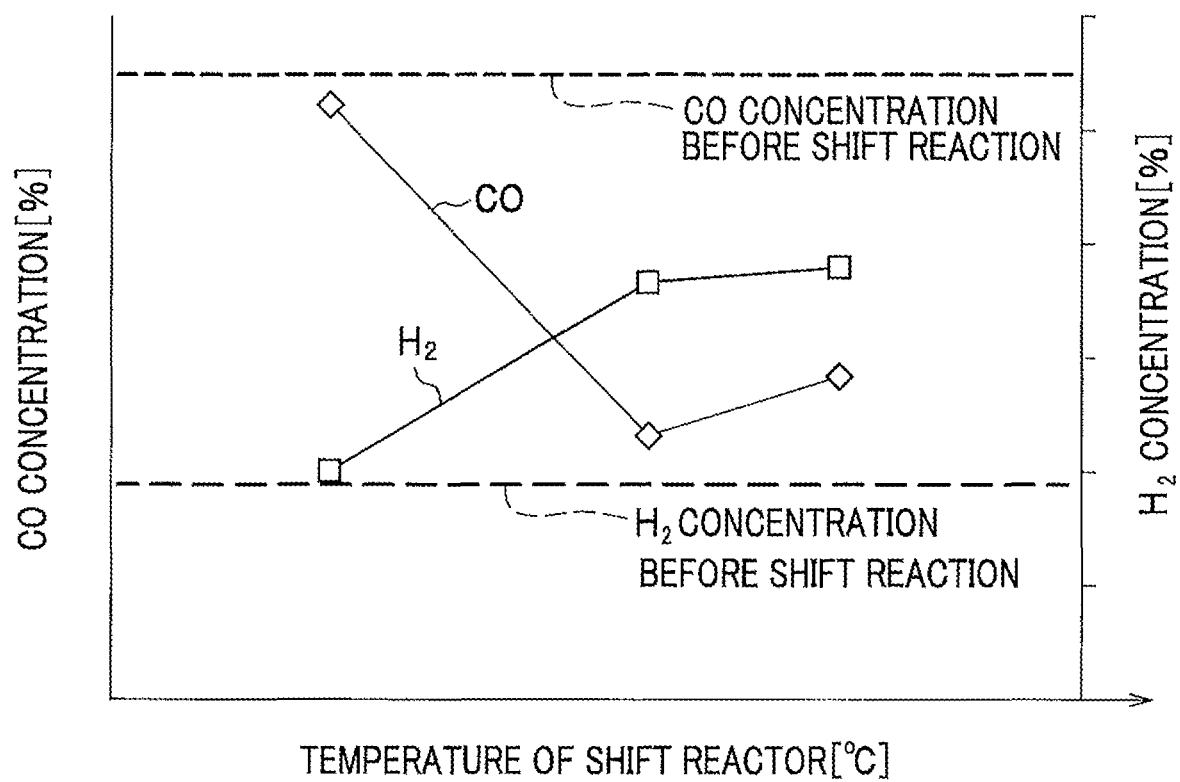
FIG. 11 is a graph showing a relationship between a temperature of the shift reactor and a hydrogen concentration and a carbon monoxide concentration after shift reaction in the fuel cell system according to the first embodiment of the present invention.

The result is shown in FIG. 11. FIG. 11 is a graph showing a relationship between the temperature of the shift reactor 23 and the CO concentration and the hydrogen concentration after the shift reaction. The left vertical axis of the graph is the CO concentration [%], and the right vertical axis of the graph is the hydrogen ($H_2$) concentration [%]. Further, in FIG. 11, the CO concentration and the hydrogen ($H_2$) concentration before the shift reaction are indicated by broken lines.

As shown in FIG. 11, the hydrogen ($H_2$) concentration after the shift reaction tends to increase as the temperature of the shift reactor 23 is increased. Therefore, when focusing only on the hydrogen ($H_2$) concentration supplied to the fuel cell stack 20, it is desirable that the temperature of the shift reactor 23 is higher.

Meanwhile, it is found that the CO concentration after the shift reaction is reduced as the temperature of the shift reactor 23 is increased up to a certain temperature, however, the CO concentration increases conversely when the temperature exceeds the certain temperature. Then, in view of the CO concentration in the fuel gas to prevent carbon deposition in the fuel cell stack 20, it is confirmed that the temperature of the shift reactor 23 is preferably in a range of 350° C. to 550° C.

REFERENCE SIGNS LIST 10A to 10F: fuel cell system
20: fuel cell stack
22: partial oxidation reformer
23: shift reactor
24: heat exchanger
25: combustor
29: control unit
30: fuel cell
60: ejector
P1: reformed gas supply pipe
P2: fuel gas supply pipe
P3: oxidant gas supply pipe
P4: anode off-gas outlet pipe P5: raw fuel supply pipe
P6: exhaust gas recirculation pipe (first exhaust gas recirculation pipe)
P7: exhaust gas recirculation pipe (second exhaust gas recirculation pipe)
P9: oxidant gas supply path
S1: carbon monoxide concentration sensor
S2: humidity sensor
T1: temperature sensor

The invention claimed is:

1. A fuel cell system comprising:
    a partial oxidation reformer for partially oxidizing raw fuel to produce carbon monoxide and hydrogen;
    a shift reactor for shift reacting the carbon monoxide with steam to produce carbon dioxide and hydrogen;
    a fuel cell stack for generating electric power by electrochemical reaction between oxidant gas and the hydrogen which is produced in at least one of the partial oxidation reformer or the shift reactor;
    an exhaust gas recirculation pipe for supplying steam contained in exhaust gas of the fuel cell stack to the shift reactor; and
    a combustor for combusting the hydrogen which is unreacted and contained in the exhaust gas of the fuel cell stack,
    wherein the exhaust gas recirculation pipe supplies steam contained in exhaust gas of the combustor to the shift reactor,
    wherein the fuel cell stack is formed by stacking a plurality of solid oxide fuel cells, and
    wherein the exhaust gas contains anode off-gas of the plurality of solid oxide fuel cells.

2. The fuel cell system according to claim 1, further comprising an oxidant gas supply path which supplies oxidant gas for partially oxidizing the raw fuel to the partial oxidation reformer,
    wherein the oxidant gas supply path is disposed close to the shift reactor so that the oxidant gas flowing through the oxidant gas supply path can cool the shift reactor by heat exchange with the shift reactor.

3. The fuel cell system according to claim 1,
    wherein the partial oxidation reformer and the shift reactor are formed integrally.

* * * * *